US00RE35891E

United States Patent [19]

Jamaluddin et al.

[11] E Patent Number: Re. 35,891

[45] Reissued Date of Patent: Sep. 8, 1998

[54] PROCESS FOR INCREASING NEAR-WELLBORE PERMEABILITY OF POROUS FORMATIONS

[75] Inventors: Abul K. M. Jamaluddin; Taras W. Nazarko, both of Calgary, Canada

[73] Assignee: Noranda Inc., Quebec, Canada

[21] Appl. No.: 538,664

[22] Filed: Oct. 3, 1995

Related U.S. Patent Documents

Reissue of:

[64] Patent No.: 5,361,845
Issued: Nov. 8, 1994
Appl. No.: 70,812
Filed: Jun. 3, 1993

[30] Foreign Application Priority Data

Dec. 22, 1992 [CA] Canada ..... 2086040

[51] Int. Cl.[6] ..... E21B 43/24

[52] U.S. Cl. ..... 166/302; 166/272

[58] Field of Search ..... 166/302, 303, 166/272

[56] References Cited

U.S. PATENT DOCUMENTS

| | | |
|---|---|---|
| 2,685,930 | 8/1954 | Albaugh . |
| 2,782,859 | 2/1957 | Garst . |
| 3,603,396 | 9/1971 | Braun . |
| 3,847,222 | 11/1974 | Braden, Jr. . |
| 4,164,979 | 8/1979 | Nooner . |
| 4,227,575 | 10/1980 | Nooner . |
| 4,454,917 | 6/1984 | Poston . |
| 4,574,886 | 3/1986 | Hopkins et al. . |
| 4,615,392 | 10/1986 | Harrigal . |
| 4,703,800 | 11/1987 | Hanna . |
| 4,844,169 | 7/1989 | Sloat . |
| 4,875,809 | 10/1989 | Csajtai et al. . |
| 5,052,490 | 10/1991 | Reed . |
| 5,255,740 | 10/1993 | Talley . |

FOREIGN PATENT DOCUMENTS

| | | |
|---|---|---|
| 915573 | 11/1972 | Canada . |
| 1282685 | 4/1991 | Canada . |

*Primary Examiner*—William P. Neuder
*Attorney, Agent, or Firm*—Keck, Mahin & Cate

[57] ABSTRACT

A method of increasing the near-wellbore permeability of porous formation comprises exposing formation to an elevated temperature of [400°] *600°* C. or greater to cause dehydration of the clay lattices, vaporization of any blocked water, mud filtrate or other fluids, and/or destruction of the clay structure.

6 Claims, No Drawings

PROCESS FOR INCREASING NEAR-WELLBORE PERMEABILITY OF POROUS FORMATIONS

Matter enclosed in heavy brackets [ ] appears in the original patent but forms no part of this reissue specification; matter printed in italics indicates the additions made by reissue.

This invention relates to a process for increasing near-wellbore permeability of a porous subterranean formation.

BACKGROUND OF THE INVENTION

Most porous formations contain clay minerals, which are crystalline in nature and have lattice-layer silicates and chain silicates. The lattice-layer silicates are formed of combinations of two basic building blocks, a silicone-oxygen tetrahedron, and an aluminum-oxygen-hydroxyl octahedron. These units are polymerized into sheets. Tetrahedral sheets are formed by sharing of corners, while octahedral sheets are formed by sharing of edges. There are two types of octahedral sheets: one in which every octahedral site is filled by a divalent ion and one in which two out of three sites are filled by trivalent ions. The first and second sheets are referred to as trioctahedral and dioctahedral sheets, respectively. The polymerization process can also be continued by hooking together terahedral and octahedral sheets to form a 1:1 composite layer. In the composite layer, the octahedral sheet could also be a dioctahedral one. Similarly, a 2:1 composite layer can also be formed by using two tetrahedral sheets to the central octahedral layer. At 2:1 composite layer could be formed of dioctahedral or trioctahedral sheets.

Clay surfaces of the most common clays have many negatively charged sites, which make them fresh-water sensitive. Previous studies have established that clay occur naturally as either pore-lining or pore-filing minerals. These clay minerals usually are surrounded by saline connate water layer. The cations (e.g., $Na^+$, $Ca^{++}$ etc.) from the saline water neutralizes the negative charges in clay minerals. The introduction of fresh water or less saline water into the formation, dilute the connate water and reduce its saline content. Because of this cation-charge deficiency around clay minerals, water molecules can easily invade in between clay platelets and results in swelling or dispersion. Therefore, charge deficiency in the minerals is an important quantity. It determines the forces holding the layers together. With mica group, these forces are relatively large. For smectites the forces are relatively small. The results is that interlayer cations can leave and enter the structure readily. In addition, water and organic molecules can enter and leave readily. Water tends to hydrate interlayer cations and result in a swelling of structure perpendicular to these layers. Organic materials also cause swelling.

Clay materials either were originally deposited during sedimentation, were formed later by the action of heat, pressure, and time on minerals already present, or were precipitated from fluids flowing through the matrix. The major components of clay are smectite, kaolinite, illite and mixed layer (i.e., illite-smectite). The two major mechanisms by which these minerals cause permeability damage are swelling and migration. In swelling, clay imbibes fresh water into its crystalline structure and subsequently increases in volume, plugging the pores in which it resides. Mixed layer and smectite are examples of swelling clays. In migration, clay minerals can be dispersed by contact with a foreign fluid or can be entrained by produced fluids and transported until a restriction is encountered (usually a pore throat), where the entrained particles bridge and restrict flow in the capillary. Kaolinite, illite, chlorite and mixed-layer are examples of migrating clays.

During drilling, if water-based drilling mud is used, mud filtrate will invade and damage the near-wellbore formation to some degree. During completion, the completion fluid can also invade and damage the near-wellbore formation. The cause of the formation damage can be explained by several possible factors including:

1. the invasion of drilling fluid causes clay minerals to swell and to constrict pore throats; this constriction causes a decrease in formation porosity and permeability, and an increase of the capillary effects.
2. the invasion of water-based fluid also causes water blockage due relative-permeability effects (two-phase flow).

The above-mentioned factors and other possible factors subsequently cause permeability reduction. Hydraulic-fracture treatments are often effective in by-passing the clay-related formation damage. However, these treatment techniques of clay-related formation damage, especially in horizontal wells, are difficult to perform and could be uneconomic. Therefore, there is a need in the petroleum industry for a new and improved method of treating clay-related formation damage.

In addition to the conventional acid and hydraulic-fracture treatments, several unconventional methods are disclosed in the literature. The following is a brief description of some of these disclosures.

U.S. Pat. No 4,844,169 presents a method of injecting non-reactive gas (i.e., nitrogen) into the formation at atmospheric temperature to fluidize the clays, including migratable fines, for their removal. Subsequently, an aqueous solution of soft water containing potassium chloride is proposed to be injected into the formation to cause a potassium-sodium cationic exchange within the swellable clays to reduce their swelling. In this method, temperature is kept low and clay structures are not altered. The fluidized clay particles can also block pore throat and subsequently, the treating fluid will be unable to contact the swelling clays. After low-temperature injections, chemical treatments may cause reswelling of the clays.

Canadian patent No. 915,573 discloses a method of treating the near-wellbore formation damage by contacting the formation with heated air or gas at a 121° C. (250° F.) temperature to cause partial dehydration of clays. Thereafter, the near-wellbore formation is treated with non-ionic vinyl pyrrolidone polymer to prevent reswelling of clays. In this 2-step method, the partial dehydration remedies the formation damage temporarily. However, subsequent chemical treatment may not be very effective because of the lack of good contact between the polymer solution and the formation.

Injection of aqueous solution of nitrogen at an elevated temperature of 260° C. to 310° C. (500° F. to 590° F.) to transform montmorillonite clays to more stable illitic-type clays was disclosed in U.S. Pat No. 4,227,575. These illitic-type clays are less sensitive to fresh water. The transformation of montmorillonite clays to illitic-type clays are possible by this method, but the aqueous solution of nitrogen can also trigger swelling of other minerals (e.g. glauconite paloids).

The use of saturated and superheated steam at temperatures of 104° C. to 871° C. (220° F. to 1600° F.) and at pressures of 14.7 to 8000 psia was proposed in U.S. Pat. No. 3,847,222 to treat the near-wellbore formation damage. Subsequent to steam treatment, the injection of guanidine hydrochloride in methanol was shown to achieve better results. In this two-step process, the condensed steam will act as a source of fresh water and cause formation damage in the untreated regions.

The simultaneous injection of steam and vaporized hydrogen chloride to rectify clay-related formation damage is presented in U.S. Pat No. 4,454,917. The purpose of steam is to clean the formation and the purpose of hydrogen chloride is to react with calcium and magnesium salts in the near-wellbore formation to form water-soluble chloride salts. In this process, the condensed steam is also a source of fresh water and could cause formation damage due to reswelling of clay minerals.

Another preventive technique disclosed in Canadian patent No. 1,282,685 is the removal of precursor ions from the injection water using reverse osmosis before injection into the formation. The removal of precursor ions will reduce precipitation in the formation and subsequently reduce the chances of formation damage. In this technique, the removal of precursor ions may not necessarily prevent the swelling and/or migration of clay materials in the formation.

SUMMARY OF THE INVENTION

It is the object of the present invention to provide a new method for increasing the permeability of near-wellbore formation containing hydratable clays, shales and other materials which tend to swell when contacted with fresh water and/or mud filtrate.

It is also the object of the invention to provide a new method for increasing the permeability of near-wellbore formation containing migratable clays, which are fluid velocity sensitive.

It is a further object of the present invention to provide a new method for increasing the permeability of near-wellbore formation whose wettability tends to cause water and/or fluid blockage.

It is thus generally the object of the invention to provide a new method for increasing near-wellbore permeability of any porous formation either containing hydratable clays, shales or other minerals which tend to swell when contacted with fresh water and/or mud filtrate, or a formation which has migratable clays, or a formation whose wettability tends to cause water and/or fluid blockage.

The method in accordance with the present invention consists of exposing the formation to an elevated temperature of [400°] *600°* C. or greater to cause dehydration or the clay lattices, vaporization of any blocked water, mud filtrate, or other fluids, and/or destruction of the clay structure.

The porous formation can be effectively treated to improve hydrocarbon permeability either prior to water and/or mud filtrate contact or after damage by water and/or mud filtrate. The heat treatment typically lasts for several hours, preferably more than 4 hours after the desired temperature is reached.

The temperature of this heat treatment is desirably about [400°] *600° C.* to 1000° C., preferably 600° to 800° C.

The above heat treatment may be carried out using downhole heaters including electrical resistance or gas heaters with air and/or inert gas injection. The desirable injection pressure must be higher than the reservoir pressure. Use of high frequency dipole heating with or without gas injection is also envisaged.

The advantages of the preset invention is that the high temperature destroys clay structure so that there is no possibility of rehydration and reswelling of clay minerals. Therefore, chemical post treatments are not required. In addition, laboratory tests have shown that the destruction of clay structure not only improves the damaged permeability but also improves the original permeability of the virgin formation.

DETAILED DESCRIPTION OF THE INVENTION

In this invention, a subterranean formation containing one or more hydratable clays, one or more migratable clays, one or more hydratable shales, and/or one or more combinations thereof, where the clays and shales both tend to swell when contacted with fresh water and/or mud filtrate, and/or formation whose wettability tends to cause water and/or fluid blockage, is exposed to an elevated temperature of [400°] *600°* C. or higher, either prior to water contact or after the formation has been contacted with water from underground or other sources and therefore has become hydrated and expanded and/or water blocked so as to substantially reduce the permeability of that formation relative to the original permeability of the virgin reservoir.

The porous formation is preferably treated to improve hydrocarbon permeability prior to water and/or fluid contact or after damage by water and/or fluid. The heat treatment typically last for several hours, preferably more than 4 hours after the desired temperature is reached. The three basic principles of formation heat treatment are given below:

1. dehydration of clay lattices,
2. vaporization of any blocked water, mud filtrate, or other fluids, and/or
3. destruction of clay structure.

The temperature ranges for this heated gas treatment are desirably about [400°] *600°* C. to 1000° C., preferably 600° C. to 800° C.

The above-mentioned three steps can be carried out using a tubing or wireline-conveyed-downhole heating device placed in the wellbore. Air and/or inert gas (e.g., nitrogen) is preferably injected into the wellbore at atmospheric temperature and at a pressure higher than the reservoir pressure. Air and/or inert gas will be heated as it passes through and/or around the heating device and hot gas will be forced into the formation. The heating device can be made of an electrical-resistance heating element or a gas heater or any device that can generate heat downhole. The near-wellbore formation will be heated by the air and/or inert gas being heated by the downhole heater. This heating process is designed for cased or openhole vertical or horizontal wells. In order to reduce wellbore heat losses in the vertical direction, air and/or inert gas injection through the annular space, for the case of tubing-conveyed heaters, may be provided. For the case of wireline-conveyed heaters, injection of air and/or inert gas into the formation will reduce the heat losses.

The injection of hot air or inert gas can also be carried out by heating air and/or inert gas at the surface.

High-frequency dipole heating is another procedure which can be used in the field. In this case, the formation is heated by high frequency energy transmitted through an antenna located in the wellbore. This heating procedure is suitable only for openhole vertical or horizontal wells. It can also be applied to a newly drilled well before casing is placed into the formation of interest. In this case, it is not required to inject air and/or inert gas into the wellbore to carry the heat into the formation. However, the injection of air and/or inert gas into the formation during heating will prevent heat front propagation towards the antenna and also can mobilize the clay minerals and be beneficial. The high-frequency dipole heating is rapid and propagates into a large area.

By the application of either of the above-mentioned procedures for several hours, depending on the injectivity of the formation and the desired degree of treatment, the permeability of the near-wellbore formation can be increased significantly. The injected heat completely or partially dehydrates the clay-bound water, evaporates the blocked water and/or fluid and destroys the clay structures, thus leaving no possibility of rehydration when the formation is resaturated with formation water.

The invention will now be disclosed, by way of example, with reference to the following two examples:

EXAMPLE 1

Small core plugs, measuring 3.98 centimeters in length and 3.75 centimeters in diameter, were obtained from full-diameter cores, taken from the gas-bearing formation, in a conventional manner. The average porosity was estimated to be 12% and the initial absolute permeability (i.e., at zero connate-water saturation) to air was 17.85 millidarcies (md). This permeability was considered to be the base permeability.

The petrographic studies indicated that the sandstone formation under consideration was of poor quality due to the presence of swelling clays and glauconitic peloids. The formation contained 78% quartz, 9% clays, and 13% glauconite materials. The major components of clay are 58% illite, 38% mixed layer (i.e., illite-smectite), and 4% kaolinite.

The core sample was saturated with produced formation water. The post-brine-desaturation permeability of 5.19 md reflects a 70% decrease in air permeability when a residual-brine phase remains in the core. The core was then saturated with KCd/Polymer mud filtrate. A nitrogen flood was performed to reduce the mud-filtrate saturation, thereby establishing an irreducible mud-filtrate saturation level. At this point a post-mud-filtrate permeability of 2.86 md was measured which indicated an 84% reduction from the initial air permeability.

The core under consideration was subjected to a sequential heat treatment at temperatures ranging from 200° C. to 800° C. During heating, the core was placed into a reactor and heated in a high-temperature oven. A constant pressure of 2,413 kPa was maintained inside the reactor using a regulated nitrogen source and a back-pressure regulator. The heating was maintained for 4 to 6 hours after the desired temperature was reached in the core sample. The permeability of the treated core was measured after cooling the core sample to atmospheric temperature.

The heat treatment of the core under consideration at 200° C. yielded an increased air permeability to 56% below the base permeability. The increase in permeability is most likely attributable to the partial evaporation of the residual mud-filtrate phase. Total evaporation of the mud filtrate during the 200° C. heat treatment did not occur because the internal reactor pressure was maintained at 2,413 kPa, which is above the saturation pressure at this temperature. It was also observed from mass measurements that the total fluid in the core was not evaporated. From the gas analyses conducted at 200° C., hydrocarbon evolution from the core is evident as well as possible degradation of carbon-based minerals.

The second heat treatment at 400° C. revealed a further permeability increase to 11.9% below the base permeability. The mass measurements indicated that the residual fluid was completely evaporated. The reduction of residual hydrocarbons, a more extensive decrease in hydration water and a partial degradation of carbonaceous minerals increased the permeability significantly.

The third heat treatment at 600° C. yielded a 51% increase in air permeability above the base permeability. Further decrease in sample mass indicated that the heating at 600° C. has had a significant effect on the mineral structures. The petrographic studies revealed that the permeability reducing minerals have broken down, resulting in a significant permeability increase. The petrographic studies also revealed that the heating at 600° C. improved the core porosity from 12% to 15%.

A dramatic permeability increase of 764% occurred during the fourth heat treatment at 800° C. An additional decrease in sample mass was also observed. The petrographic studies suggested that the swelling-clay and shale structures were completely destroyed during this heating phase. Even after the rehydration of the test core with formation water (after heating at 800° C.), the permeability was maintained at 622% above the base permeability.

EXAMPLE 2

Heating tests were also carried out on cores taken from the oil-bearing formation. The average porosity of the formation was estimated to be 15% and the air permeability is on the order of 25 md and the oil phase permeability was 0.9 md at 100% oil saturation. The petrographic studies on cores indicated that the formation was a moderately sorted, fine-grained, quartzose sublitharenite with good porosity and moderate permeability. The XRD analysis indicated that quartz material dominated the mineralogy (85%). The total clay content was about 15%. Kaolinite dominated the clay mineralogoy (86%) and illite constituted the remaining 14%. Smectite and mixed-layer illite-smectite clays were not found in the XRD analysis. The reservoir had modified intergranular porosity of about 8% and a supplemental grain moldic porosity of about 3%. The sandstone formation appeared to be sensitive to water and to conditions that could induce fines migration.

The core sample was sequentially exposed to brine, mud filtrate, heat and brine. In these tests, one temperature (800° C.) was used to evaluate the effect of heat on oil-saturated core permeability. It was anticipated that the exposure of an oil-saturated core to heat would result in coking of the oil and eventual reduction in permeability. The experimental setup was modified to flush nitrogen through the core. This way the oil is pushed out of the core as the core is exposed to heat. During the experiment, no liquid phase was seen at the outlet end of the core. In this experiment, the reactor was maintained under 16,500 kPa confining pressure (reservoir pressure). In a field situation, the injection of hot nitrogen would push the near-wellbore fluid far into the reservoir and expedite the heating around the well-bore.

The results indicated that mud filtrate caused substantial (38%) reduction in oil-phase permeability, likely due to a combination of phase trapping and clay deflocculation. However, the high-temperature (800° C.) exposure for four hours increased the oil permeability by about 1000% over the original permeability. Even after rehydration with conate water, permeability was still 748% greater than the initial "undamaged" baseline permeability.

The results of the petrographic studies indicated that most of the kaolinite was destroyed with only a few kaolinite pseudomorphs remaining. SEM studies suggest that the hydrocarbon was not been coked to insoluble carbon. The increase in permeability is mostly due to the destruction of the kaolinite minerals and to the subsequent transport of the degraded clay with hydrocarbon through the pore system.

We claim:

1. A method off increasing the near-wellbore permeability of porous formations containing hydratable clays, shales, materials which swell when contacted with water or mud filtrate, migratable clays or a formation having a wettability which causes water or fluid blockage, comprising exposing the formation to a temperature of at least [400°] *600°* C. by using downhole heaters with continuous inert gas injection to cause dehydration of clay lattices, vaporization of any blocked water, mud filtrate or other fluids, and destruction of the clay structure.

2. A method of defined in claim 1, wherein the formation is exposed to a temperature of at least [400°] *600°* C. either prior to water and/or mud filtrate contact or after damage with water and/or mud filtrate.

3. A method as defined in claim 1, wherein the heat treatment lasts more than 4 hours after the desired temperature is reached.

4. A method as defined in claim 1, wherein the temperature of the heat treatment is about [400°] *600° C.* to 1000° C.

5. A method as defined in claim 1, wherein inert gas is injected at a pressure higher than the reservoir pressure.

6. A method as defined in claim 1, wherein the downhole heater is an electrical resistance heater, a gas heater, or a high frequency dipole heating device.

* * * * *